United States Patent
Konno et al.

(10) Patent No.: US 10,036,649 B2
(45) Date of Patent: *Jul. 31, 2018

(54) PROVIDING ROAD GUIDANCE BASED ON ROAD ATTRIBUTES AND DIRECTIONS

(71) Applicant: International Business Machines Corporation, Armonk, NY (US)

(72) Inventors: Kazuhiro Konno, Ichikawa (JP); Akira Saito, Ichikawa (JP); Yuhichi Takahashi, Zama (JP); Hayato Uenohara, Funabashi (JP)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/267,428

(22) Filed: Sep. 16, 2016

(65) Prior Publication Data
US 2018/0080789 A1    Mar. 22, 2018

(51) Int. Cl.
*G01C 21/36*    (2006.01)

(52) U.S. Cl.
CPC ....... *G01C 21/3664* (2013.01); *G01C 21/367* (2013.01); *G01C 21/3676* (2013.01)

(58) Field of Classification Search
CPC .............. G01C 21/3664; G01C 21/367; G01C 21/3676; G08G 1/0969
See application file for complete search history.

(56) References Cited

U.S. PATENT DOCUMENTS

| 6,006,161 | A | * | 12/1999 | Katou | ................. G08G 1/0969 340/988 |
| 6,026,346 | A | | 2/2000 | Ohashi et al. | |
| 6,064,941 | A | | 5/2000 | Nimura et al. | |
| 6,950,743 | B2 | | 9/2005 | Kainuma et al. | |

(Continued)

FOREIGN PATENT DOCUMENTS

| JP | 2000111354 A | 4/2000 |
| JP | 2009156656 A | 7/2009 |

(Continued)

OTHER PUBLICATIONS

Saito et al., Automobile navigation system using beacon information, 1989, IEEE, p. 139-145.*

(Continued)

*Primary Examiner* — McDieunel Marc
(74) *Attorney, Agent, or Firm* — Edward P. Li (57) ABSTRACT

A method, a computer program product, and a computer system for providing road guidance on a navigation system. The navigation system determines a moving direction of a cursor on a map of the navigation system, wherein the cursor is movable by a user. The navigation system obtains a road near the cursor. The navigation system determines whether one or more attributes of the road coincide with predetermined attribute settings. The navigation system determines whether a direction of the road coincides with the moving direction of the cursor, in response to determining that the one or more attributes of the road coincide with the predetermined attribute settings. The navigation system deter- (Continued)

mines to provide guidance, in response to determining that the direction of the road coincides with the moving direction of the cursor.

6 Claims, 6 Drawing Sheets

(56) References Cited

U.S. PATENT DOCUMENTS

| | | | |
|---|---|---|---|
| 7,239,964 B2* | 7/2007 | Takizawa | G01C 21/367 340/990 |
| 7,788,032 B2 | 8/2010 | Moloney | |
| 7,873,470 B2* | 1/2011 | Baba | G01C 21/367 340/995.1 |
| 9,189,959 B2 | 11/2015 | Bank et al. | |
| 9,222,796 B2 | 12/2015 | Nagasaka et al. | |
| 9,341,494 B2 | 5/2016 | Kosakowski et al. | |
| 9,528,848 B2 | 12/2016 | Nakagawa | |
| 9,816,826 B2 | 11/2017 | Renz | |
| 2010/0280713 A1 | 11/2010 | Stahlin et al. | |
| 2013/0101331 A1 | 4/2013 | Morrow et al. | |
| 2014/0310594 A1 | 10/2014 | Ricci et al. | |

FOREIGN PATENT DOCUMENTS

| | | |
|---|---|---|
| JP | 2012185721 A | 9/2012 |
| WO | 2011124272 A1 | 10/2011 |

OTHER PUBLICATIONS

Fan et al., GPS/MAP Based Road Parameters Acquirement for Automotive Control System, 2009, IEEE, p. 213-218.*
Kirson, A compact driver interface for navigation and route guidance, 1995, IEEE, p. 61-66.*
French Historical of automobile navigation technology, 1996, IEEE, p. 350-358 (Year: 1996).*
Ishikawa et al., "Map navigation software of the electro-multivision of the '91 Toyota Soarer", 463-473.
Sweeney, "Comparative benefits of various automotive navigation and routing technologies", 1996, IEEE, p. 415-421.
Appendix P List of IBM Patents or Applications Treated as Related. Dated Nov. 29, 2017. Two pages.
Konno et al. Original U.S. Appl. No. 15/793,430, filed Oct. 25, 2017.
Konno et al. Original U.S. Appl. No. 15/825,213 filed Nov. 29, 2017.

* cited by examiner

FIG. 1

THE CURSOR IS DRAWN INTO THE ROAD SO THAT
IT MOVES ALONG THE ONE-WAY ROAD

THE CURSOR IS REJECTED SO THAT IT IS NOT DRAWN INTO
THE ROAD OR IT DOES NOT ENTER THE ONE-WAY ROAD

FIG. 2

THE CURSOR IS DRAWN INTO THE HIGHWAY SO
THAT IT MOVES ALONG THE HIGHWAY

THE CURSOR IS REJECTED SO THAT IT IS NOT DRAWN INTO
THE LOCAL ROAD OR IT DOES NOT ENTER THE LOCAL ROAD

PROVIDING ROAD GUIDANCE BASED ON ROAD ATTRIBUTES AND DIRECTIONS

BACKGROUND

The present invention relates generally to a navigation system, and more particularly to providing road guidance based on road attributes and directions and corresponding to user's operation of a remote controller.

In previous disclosures, a remote controller presenting force sensations is adapted to provide guidance to an element such as a button or icon fixed on a map. Through a remote controller presenting force sensations, a user interface that displays a map (such as car navigation systems) provides guidance by kinetic and haptic feedback to a user. Previous disclosures present techniques associated with generating a reaction map for creating force sensations and using basic functions of a remote controller presenting force sensations. Previous disclosures also present techniques of providing mapping navigation road information by using a series of coordinates obtained from a user-interface operation of tracing on a map.

SUMMARY

In one aspect, a method for providing road guidance on a navigation system is provided. The method is implemented by the navigation system. The method includes determining a moving direction of a cursor on a map of the navigation system, wherein the cursor is movable by a user. The method further includes obtaining a road near the cursor. The method further includes determining whether one or more attributes of the road coincide with predetermined attribute settings. The method further includes determining whether a direction of the road coincides with the moving direction of the cursor, in response to determining that the one or more attributes of the road coincide with the predetermined attribute settings. The method further includes determining to provide guidance, in response to determining that the direction of the road coincides with the moving direction of the cursor.

In another aspect, a computer program product for providing road guidance on a navigation system is provided. The computer program product comprises a computer readable storage medium having program code embodied therewith. The program code executable to determine, by the navigation system, a moving direction of a cursor on a map of the navigation system, wherein the cursor is movable by a user. The program code executable to obtain, by the navigation system, a road near the cursor. The program code executable to determine, by the navigation system, whether one or more attributes of the road coincide with predetermined attribute settings. The program code executable to determine, by the navigation system, whether a direction of the road coincides with the moving direction of the cursor, in response to determining that the one or more attributes of the road coincide with the predetermined attribute settings. The program code executable to determine, by the navigation system, to provide guidance, in response to determining that the direction of the road coincides with the moving direction of the cursor.

In yet another aspect, a computer system for providing road guidance on a navigation system is provided. The computer system comprises one or more processors, one or more computer readable tangible storage devices, and program instructions stored on at least one of the one or more computer readable tangible storage devices for execution by at least one of the one or more processors. The program instructions are executable to: determine, by the navigation system, a moving direction of a cursor on a map of the navigation system, wherein the cursor is movable by a user; obtain, by the navigation system, a road near the cursor; determine, by the navigation system, whether one or more attributes of the road coincide with predetermined attribute settings; determine, by the navigation system, whether a direction of the road coincides with the moving direction of the cursor, in response to determining that the one or more attributes of the road coincide with the predetermined attribute settings; determine, by the navigation system, to provide guidance, in response to determining that the direction of the road coincides with the moving direction of the cursor.

DETAILED DESCRIPTION

Embodiments of the present invention discloses a method for providing guidance by selecting and de-selecting a road on a map based on road attributes and directions and corresponding to user's operation of a remote controller. In one embodiment of the present invention, the remote controller can feedback force sensation to the user.

In one embodiment, the operation direction of a cursor of a remote controller and attributes of a road are taken into account and thereby a navigation system selects the road and provides guidance for a user. The attributes of the road include a one-way road, a road width, and a road type (such as highway, toll road, and local road). The attributes that the user wants to set for selecting a road can be set in advance and thus the user can select a road that is desired by the user. The attributes can also be obtained from the car navigation system.

Embodiments of the present invention can be used in the next generation of the car navigation system. The present invention facilitates route designation in a case where a function is to be used to trigger some actions in response to a vehicle passing a particular route in a designated direction. When the present invention is applied to a navigation system that obtains real time road-conditions, the road conditions may be taken into account for determining whether a vehicle should be guided along the road. For example, the present invention makes it possible to provide more flexible road selection such as not selecting closed or busy roads.

Figure 1:
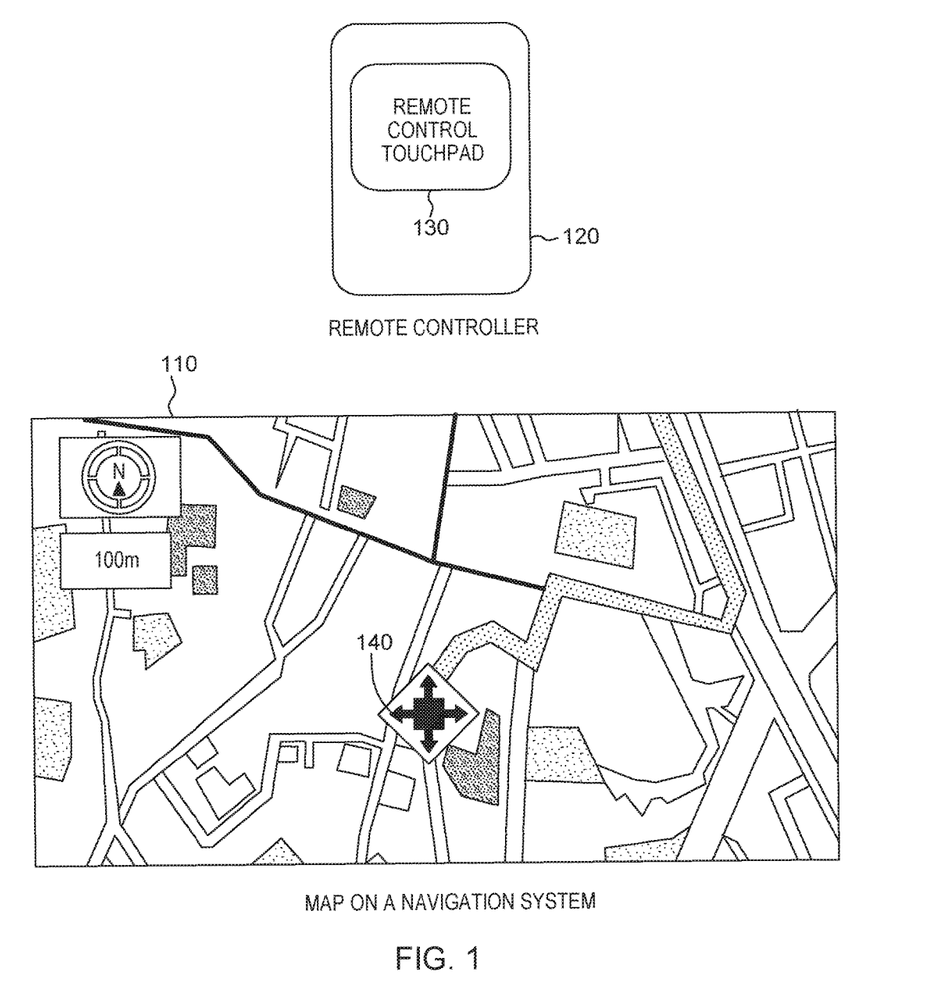
FIG. 1 is a diagram illustrating a map of a navigation system and a remote controller, in accordance with one embodiment of the present invention.

FIG. 1 is a diagram illustrating map 110 of a navigation system and remote controller 120, in accordance with one embodiment of the present invention. Remote controller 120 includes remote control touchpad 130. A user uses remote control touchpad 130 to operate cursor 140 on map 110. In other embodiments, map 110 is a reaction map that creates force sensation. In the other embodiments, when a road is selected or de-selected, the force sensation is generated by map 110, and the force sensation is provided to a user through remote controller 120; when a navigation system makes decision regarding the force sensation, the navigation system takes the road information on map 110 and user's operations of cursor 140 into account.

In a case that the system does not have a force sensation feedback feature, feedback may be provided by visual effects. For example, when a road is approached by a drag operation (such as tracing on the map), feedback may be provided by changing the color of the road that satisfies the attributes.

Figure 2:
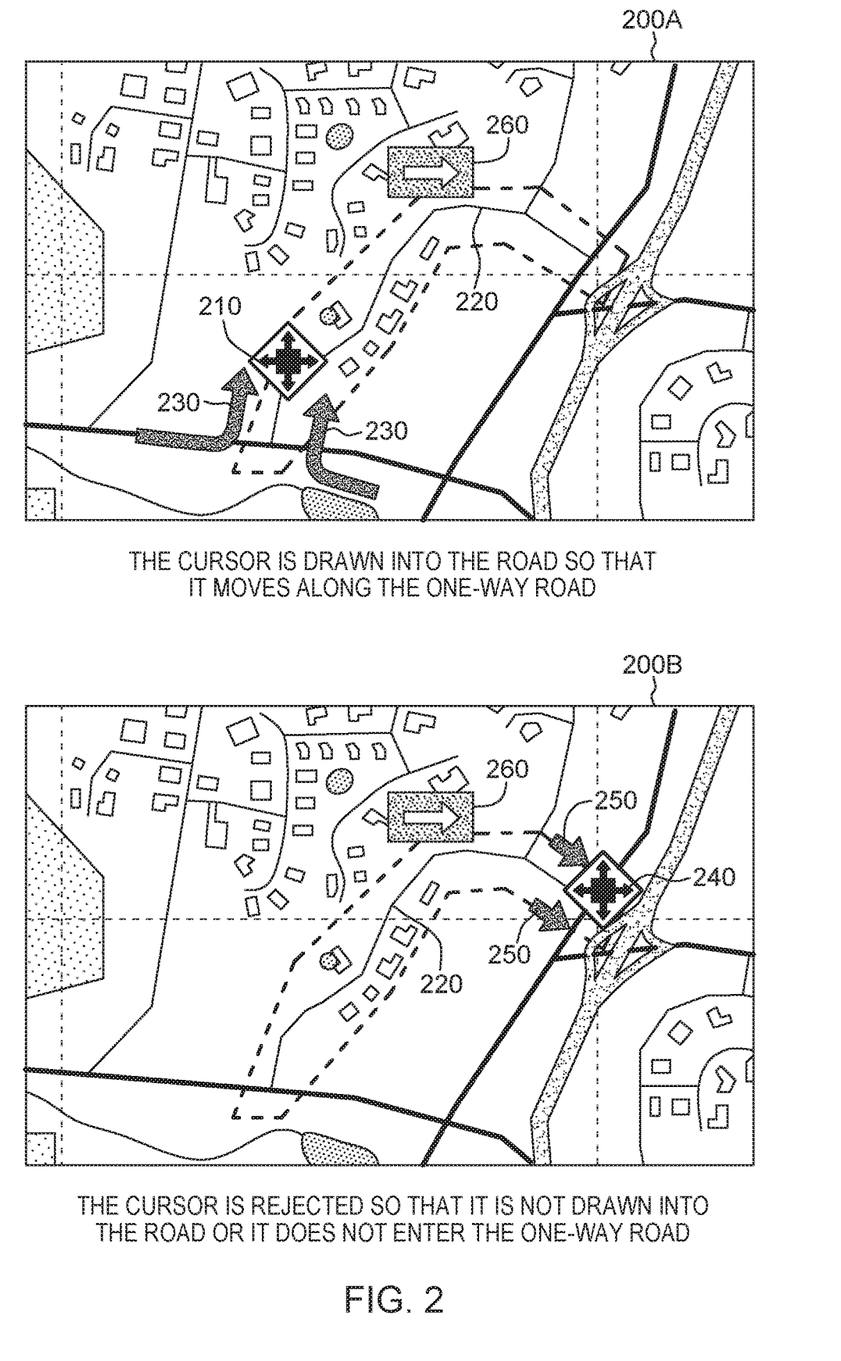
FIG. 2 is an example of providing road guidance in a case of a one-way road, in accordance with one embodiment of the present invention.

FIG. 2 is an example of providing road guidance in a case of one-way road, in accordance with one embodiment of the present invention. On maps 200A and 200B, arrows 260 show the direction of one-way road 220. When a user uses remote controller 120 to move cursor 210 on map 200A in a direction of one-way road 220, the navigation system will draw cursor 210 into road 220 so that cursor 210 will move along one-way road 220. Arrows 230 on map 200A indicate that cursor 210 is drawn into one-way road 220. In this scenario, the navigation system provides guidance. However, when a user uses remote controller 120 to move cursor 240 on map 200B in a direction that does not coincide with a direction of one-way road 220, the navigation system will reject cursor 240 from one-way road 220 so that cursor 240 will not be drawn into one-way road 220 or will not enter one-way road 220. Arrows 250 on map 200B indicate that that cursor 240 is rejected from one-way road 220. In this scenario, the navigation system does not provide guidance. In some embodiments regarding one-way road 220, when a user uses remote controller 120 to move a cursor in a direction that does not coincide with a direction of one-way road 220, the navigation system generates a force sensation repulsing the moving direction of the cursor, and the force sensation is fed back to the user by remote controller 120.

Figure 3:
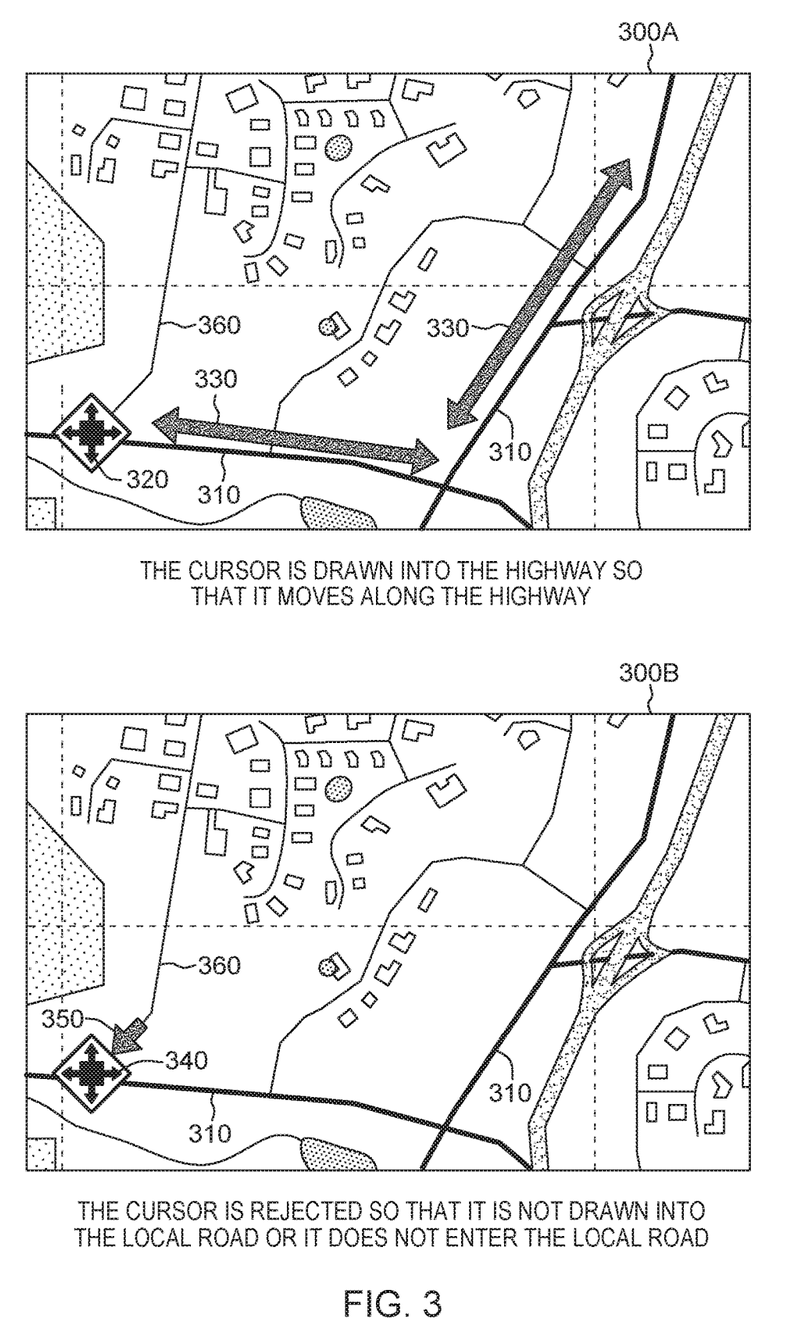
FIG. 3 is an example of providing road guidance in a case where a user selects a certain road attribute such as highway, in accordance with one embodiment of the present invention.

FIG. 3 is an example of providing road guidance in a case where a user selects a certain road attribute such as highway, in accordance with one embodiment of the present invention. Attributes of a road are taken into account; a navigation system selects the road and provides guidance for a user if the attributes of the road coincide with predetermined attribute settings. In the example, the user selects highway as a predetermined attribute setting. On map 300A, when a user uses remote controller 120 to move cursor 320 on map 300A along highway 310, the navigation system determines that the attribute of highway 310 coincides with the predetermined setting and will draw cursor 320 into road highway 310 so that cursor 320 will move along highway 310. Arrows 330 on map 300A indicate that cursor 320 moves along highway 310. In this scenario, the navigation system provides guidance. However, when a user uses remote controller 120 to move cursor 340 on map 300B along local road 360, the navigation system determines that the attribute of local road 360 does not coincide with the predetermined setting and rejects cursor 340 from entering local road 360; therefore, cursor 340 will not be drawn into local road 360 or will not enter local road 360. Arrows 350 on map 300B indicate that cursor 340 is rejected from local road 360. In this scenario, the navigation system does not provide guidance. In some embodiments regarding the local road 360, when a user uses remote controller 120 to move cursor 340 on map 300B along highway 310 and tries to move in the direction to enter local road 360, the navigation system determines that the attribute of local road 360 does not coincide with the predetermined setting and the navigation system generates a force sensation repulsing the moving direction of the cursor, and the force sensation is fed back to the user by remote controller 120.

Figure 4:
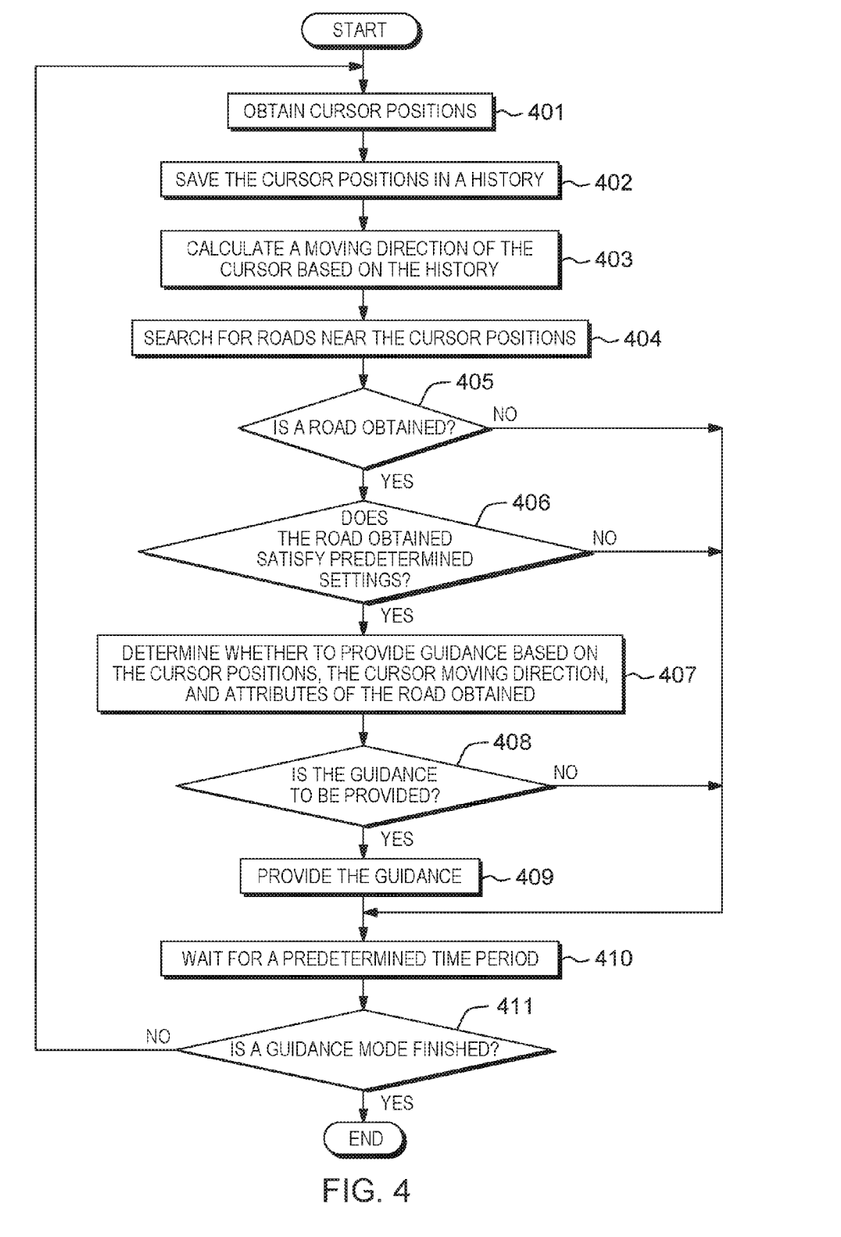
FIG. 4 is a flowchart showing operational steps for a guidance mode of a navigation system, in accordance with one embodiment of the present invention.

FIG. 4 is a flowchart showing operational steps for a guidance mode of a navigation system, in accordance with one embodiment of the present invention. The steps are implemented by the navigation system. At step 401, the navigation system obtains cursor positions. The navigation system obtains the cursor positions when a user moving a cursor to trace a road. At step 402, the navigation system saves the cursor positions in a history. At step 403, the navigation system calculates a moving direction of the cursor based on the history. At step 404, the navigation system searches roads near the cursor positions. If possible, the navigation system searches only roads that satisfy the predetermined settings. At step 405, the navigation system determines whether a road is obtained.

In response to determining that the road is obtained (YES branch of step 405), at step 406, the navigation system determines whether the road obtained satisfies the predetermined settings. In response to determining that the road obtained satisfies the predetermined settings (YES branch of step 406), at step 407, the navigation system determines whether to provide guidance based on the cursor positions, the cursor moving direction, and attributes of the road obtained. Detailed implementation of step 407 will be described in following paragraphs with reference to FIG. 5. At step 408, the navigation system determines whether the guidance is to be provided. In response to determining the guidance is to be provided (YES branch of step 408), the navigation system at step 409 provides the guidance. At step 410, the navigation system waits for a predetermined time period. Then, at step 411, the navigation system determines whether a guidance mode is finished. In response to determining that the guidance mode is finished (YES branch of step 411), the navigation system terminates the guidance mode. Otherwise, in response to determining that the guidance mode is not finished (NO branch of step 411), the navigation system will reiterate step 401.

In response to determining that the road is not obtained (NO branch of step 405), the navigation system jumps to step 410. In response to determining that the road obtained does not satisfy the predetermined settings (NO branch of step 406), the navigation system jumps to step 410. In response to determining the guidance is not to be provided (NO branch of step 408), the navigation system jumps to step 410.

Figure 5:
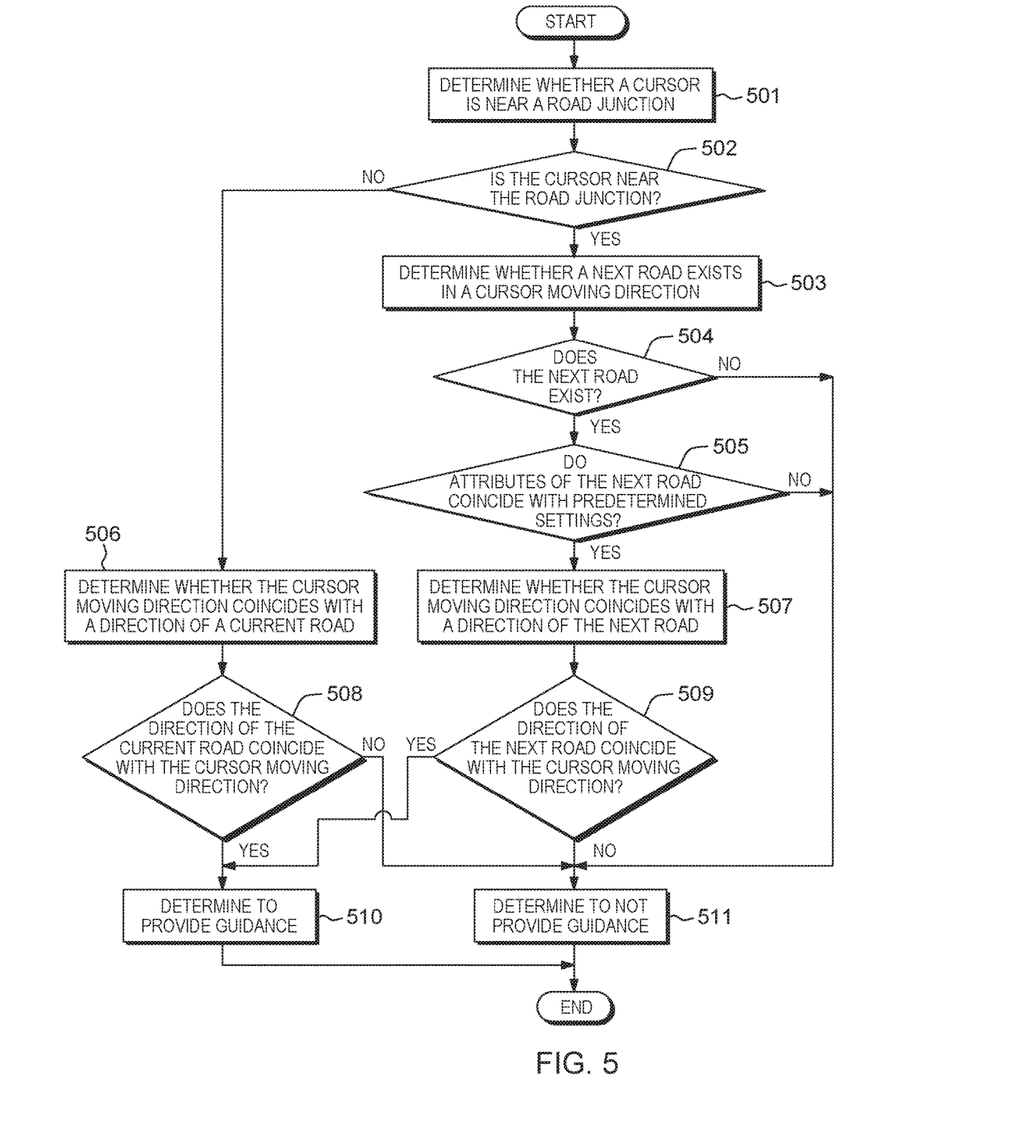
FIG. 5 is a flowchart showing operational steps for determining whether road guidance is provided, in accordance with one embodiment of the present invention.

FIG. 5 is a flowchart showing operational steps for determining whether road guidance is provided, in accordance with one embodiment of the present invention. The steps in FIG. 5 provide detailed implementation of step 407 in FIG. 4. The steps are implemented by the navigation system. At step 501, the navigation system determines whether a cursor is near a road junction.

Referring to FIG. 5, in response to determining that the cursor is not near the road junction (NO branch of decision block 502), the navigation system at step 506 determines whether a cursor moving direction coincides with a direction of a current road. In response to determining that the cursor moving direction coincides with the direction of the current road (YES branch of decision block 508), at step 510 the navigation system determines to provide guidance. Otherwise, in response to determining that that the cursor moving direction does not coincide with the direction of the current road (NO branch of decision block 508), at step 511, the navigation system determines to not provide guidance.

Referring to FIG. 5, in response to determining that the cursor is near the road junction (YES branch of decision block 502), the navigation system at step 503 determines whether a next road exists in a cursor moving direction. In response to determining that next road exists in the cursor moving direction (YES branch of decision block 504), at decision block 505, the navigation system determines whether attributes of the next road coincide with predetermined settings. In response to determining that the attributes of the next road coincide with the predetermined settings (YES branch of decision block 505), the navigation system at step 507 determines whether the cursor moving direction coincides with a direction of the next road. In response to determining that the navigation system determines that the cursor moving direction coincides with the direction of the next road (YES branch of decision block 509), at step 510 the navigation system determines to provide guidance. In response to determining that that the cursor moving direction does not coincide with the direction of the next road (NO branch of decision block 509), at step 511, the navigation system determines to not provide guidance.

Referring to FIG. 5, in response to determining that next road does not exist in the cursor moving direction (NO branch of decision block 504), at step 511, the navigation system determines to not provide guidance.

Referring to FIG. 5, in response to determining that the attributes of the next road do not coincide with the predetermined settings (NO branch of decision block 505), the navigation system at step 511 determines to not provide guidance.

Figure 6:
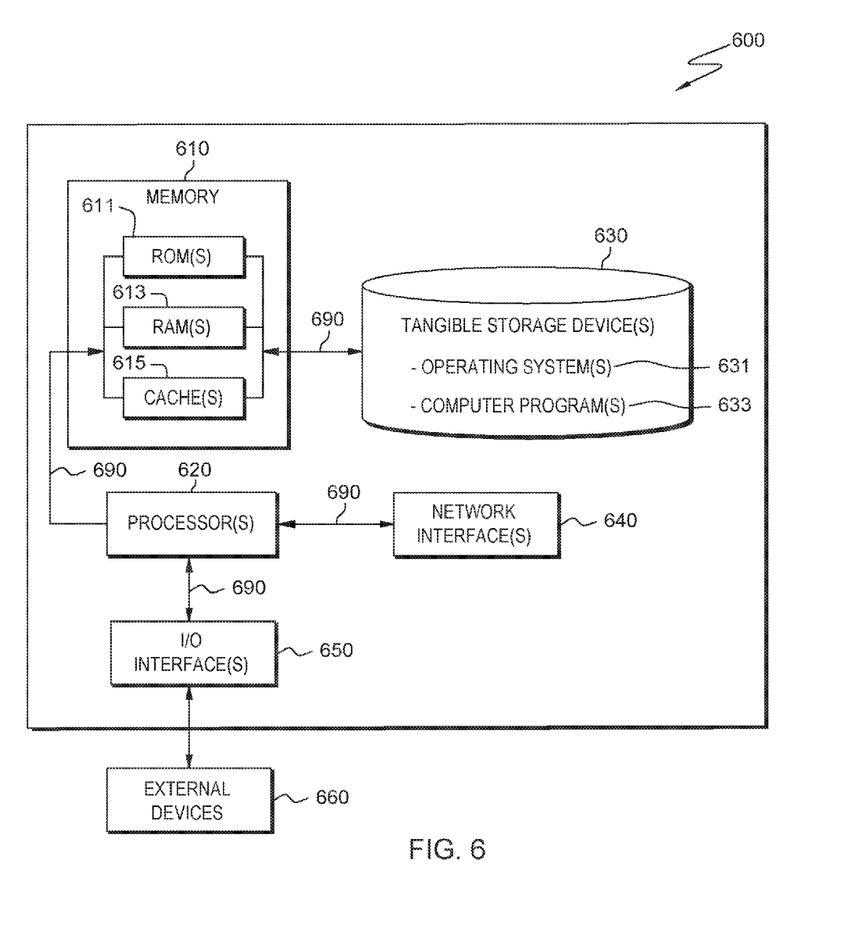
FIG. 6 is a diagram illustrating components of a computer device hosting a system for providing road guidance, in accordance with one embodiment of the present invention.

FIG. 6 is a diagram illustrating components of computer device 600 hosting a system for providing road guidance, in accordance with one embodiment of the present invention. It should be appreciated that FIG. 6 provides only an illustration of one implementation and does not imply any limitations with regard to the environment in which different embodiments may be implemented. The device may be any electronic device or computing system capable of receiving input from a user, executing computer program instructions, and communicating with another electronic device or computing system via a network. For example, the device may be a mobile phone, tablet, or laptop.

Referring to FIG. 6, computer device 600 includes processor(s) 620, memory 610, and tangible storage device(s) 630. In FIG. 6, communications among the above-mentioned components of computer device 600 are denoted by numeral 690. Memory 610 includes ROM(s) (Read Only Memory) 611, RAM(s) (Random Access Memory) 613, and cache(s) 615. One or more operating systems 631 and one or more computer programs 633 reside on one or more computer readable tangible storage device(s) 630. The system for providing road guidance resides on one or more computer readable tangible storage device(s) 630. Computer device 600 further includes I/O interface(s) 650. I/O interface(s) 650 allows for input and output of data with external device(s) 660 that may be connected to computer device 600. Computer device 600 further includes network interface(s) 640 for communications between computer device 600 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing road guidance on a navigation system, the method comprising:
   determining, by the navigation system, a moving direction of a cursor on a map of the navigation system, the cursor being movable by a user;
   obtaining, by the navigation system, a road near the cursor;
   determining, by the navigation system, whether one or more attributes of the road coincide with predetermined attribute settings;
   determining, by the navigation system, whether a direction of the road coincides with the moving direction of the cursor, in response to determining that the one or more attributes of the road coincide with the predetermined attribute settings; and
   determining, by the navigation system, to provide guidance, in response to determining that the direction of the road coincides with the moving direction of the cursor.

2. The method of claim 1, further comprising:
   drawing, by the navigation system, the cursor into the road, so as to provide the guidance.

3. The method of claim 1, further comprising:
   determining, by the navigation system, not to provide guidance, in response to determining that the direction of the road does not coincide with the moving direction of the cursor; and
   rejecting, by the navigation system, the cursor from entering the road.

4. The method of claim 1, wherein the guidance is provided by a sensation force feedback to the user through a remote controller.

5. The method of claim 1, wherein the guidance is provided on the map by a visual effect.

6. The method of claim 1, wherein the one or more attributes include at least a type of the road.

* * * * *